Reissued Nov. 11, 1924.

Re. 15,944

UNITED STATES PATENT OFFICE.

LESTER KIRSCHBRAUN, OF CHICAGO, ILLINOIS.

BITUMINOUS EMULSION AND PROCESS OF MAKING SAME.

No Drawing. Original No. 1,450,685, dated April 3, 1923, Serial No. 582,316, filed August 16, 1922. Application for reissue filed November 15, 1923. Serial No. 675,018.

*To all whom it may concern:*

Be it known that I, LESTER KIRSCHBRAUN, a citizen of the United States, residing in the city of Chicago, county of Cook, and State of Illinois, have invented certain new and useful Improvements in Bituminous Emulsions and Processes of Making Same, of which the following is a specification.

The invention relates to improvements in bituminous emulsions and process of making same, and refers more particularly to that type of emulsion which is miscible in water.

This invention may be carried out as follows:

I take sulphite liquor, preferably concentrated, which as is well known, is a relatively thick syrupy mass. This sulphite liquor is then heated. To this heated sulphite liquor, I add bituminous material in liquid condition, as for example, asphalt of a melting point of 150° F., heated so that it is in fluid condition. The sulphite liquor will be heated to about the temperature at which the asphalt melts. While the asphalt is being slowly added, the sulphite liquor is being constantly agitated so as to produce an emulsion in which the asphalt is in the dispersed phase. Water may be added from time to time to maintain the proper consistency of the emulsion.

Instead of using asphalt of 150 degrees F. melting point, petroleum residuum may be used, which is a thick liquid at normal temperatures or a particularly high melting point asphalt may be used or an asphalt having a higher melting point than 150 degrees F. but below the boiling point of water, may be used. If a high melting point asphalt is desired to be emulsified, the sulphite liquor may be maintained under a substantial pressure, so as to prevent the water from evaporating while the asphalt is being emulsified.

The invention may be carried out in the manner above described, except that there may be mixed with the sulphite liquor, bentonite or highly colloidal clay so that they both act as emulsifying agents.

One use to which this product may be put, is that of a dust layer and also as a road binder. Many other uses will occur to those skilled in the art. When this material is used for road purposes, it is desirable that the asphalt or other bitumen be of relatively low melting point so as to protect the sulphite liquor, as far as possible, from the action of rain, and assist in binding the particles of road material together. When this emulsion is made, using harder asphalt, as for example, 160–180 degrees F. melting point material, it has the property that upon drying, it does not become permanently coalesced so that it becomes possible, in such instances, to re-emulsify or remix such dry products with water.

The foregoing product may also be used as a cement and is useful in making fabric cores in which the various plies are pasted one upon the other.

Another advantage of using this material as a paste for paper products is that the broke or waste can be ground up and can be used in the beater for the reason that the asphalt not being entirely coalesced, goes back into emulsion form.

I claim as my invention:

1. An emulsion consisting of sulphite liquor and bitumen, the bitumen being in dispersed phase.

2. An emulsion consisting of sulphite liquor, an earthy colloidal material and bitumen, said bitumen being in the dispersed phase.

3. An emulsion, non-coalescible on drying, consisting of sulphite liquor, an earthy colloidal material, and a bitumen being in dispersed phase.

4. An emulsion, non-coalescible on drying, consisting of sulphite liquor, and a bitumen being in dispersed phase.

5. A bituminized sulphite liquor in emulsion form, capable of acting as a road binder.

6. A bituminized sulphite liquor in emulsion form.

LESTER KIRSCHBRAUN.